United States Patent
Zhao et al.

(10) Patent No.: US 8,660,883 B2
(45) Date of Patent: Feb. 25, 2014

(54) SYSTEM AND METHOD OF ESTIMATING THE COST OF A PRINT JOB

(75) Inventors: Shi Zhao, Rochester, NY (US); Sudhendu Rai, Fairport, NY (US); Wei Peng, Sunnyvale, CA (US)

(73) Assignee: Xerox Corporation, Norwalk, CT (US)

( * ) Notice: Subject to any disclaimer, the term of this patent is extended or adjusted under 35 U.S.C. 154(b) by 588 days.

(21) Appl. No.: 12/971,846

(22) Filed: Dec. 17, 2010

(65) Prior Publication Data
US 2012/0154850 A1    Jun. 21, 2012

(51) Int. Cl.
  *G06F 3/12* (2006.01)
  *G06Q 30/06* (2012.01)
  *G03G 21/02* (2006.01)

(52) U.S. Cl.
  CPC .......... *G06Q 30/0623* (2013.01); *G03G 21/02* (2013.01)
  USPC .......................... 705/7.35; 705/400; 705/402

(58) Field of Classification Search
  CPC .............................. G03G 21/02; G06F 3/1273
  USPC ............. 705/14.23, 27.1, 400, 7.35; 358/1.13
  See application file for complete search history.

(56) References Cited

U.S. PATENT DOCUMENTS

| | | | |
|---|---|---|---|
| 7,948,644 B2 * | 5/2011 | Carling et al. | 358/1.13 |
| 2005/0065894 A1 * | 3/2005 | Inaba | 705/400 |
| 2011/0153399 A1 * | 6/2011 | Berger et al. | 705/14.23 |
| 2011/0267647 A1 * | 11/2011 | Kamasuka | 358/1.15 |

OTHER PUBLICATIONS

C. Englund, A. Verikas; "A SOM-based data mining strategy for adaptive modelling of an offset lithographic printing process", (2007) 391-400.*

* cited by examiner

*Primary Examiner* — John Hayes
*Assistant Examiner* — Freda A Nelson
(74) *Attorney, Agent, or Firm* — Fox Rothschild LLP

(57) ABSTRACT

A method of estimating the cost of a target print job may include identifying a target print job having a document type and one or more attributes, for each attribute of the target print job, determining a correlation between the attribute and a cost of the target print job using a plurality of historical print jobs associated with the document type, and identifying one or more of the attributes as cost drivers based on the correlation of the attribute to the cost of the target print job. The method may include identifying one or more relevant historical print jobs from the plurality of historical print jobs based on values for the identified cost drivers, estimating a cost of the target print job using the one or more relevant historical print jobs, and displaying the estimated cost associated with the target print job.

14 Claims, 3 Drawing Sheets

SYSTEM AND METHOD OF ESTIMATING THE COST OF A PRINT JOB

BACKGROUND

Known algorithms for modeling a cost of print jobs typically involve manually monitoring printing steps across multiple print shops of an enterprise. This process involves a significant amount of time and user effort. In addition, the parameters that are used in known algorithms are often influenced by human activities. As such, the resulting cost estimate is often not accurate.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In an embodiment, a method of estimating the cost of a target print job may include identifying a target print job having a document type and one or more attributes, for each attribute of the target print job, determining a correlation between the attribute and a cost of the target print job using a plurality of historical print jobs associated with the document type, and identifying, by a computing device, one or more of the attributes as cost drivers based on the correlation of the attribute to the cost of the target print job. The method may include identifying one or more relevant historical print jobs from the plurality of historical print jobs based on values for the identified cost drivers, estimating, by the computing device, a cost of the target print job using the one or more relevant historical print jobs, and displaying, on a display device, the estimated cost associated with the target print job.

In an embodiment, a system for estimating the cost of a target print job may include a computing device and a computer-readable storage medium in communication with the computing device. The computer-readable storage medium may include one or more programming instructions for identifying a target print job having a document type and one or more attributes, for each attribute of the target print job, determining a correlation between the attribute and a cost of the target print job using a plurality of historical print jobs associated with the document type, and identifying one or more of the attributes as cost drivers based on the correlation of the attribute to the cost of the target print job. The computer-readable storage medium may include one or more programming instructions for identifying one or more relevant historical print jobs from the plurality of historical print jobs based on values for the identified cost drivers, estimating a cost of the target print job using the one or more relevant historical print jobs, and displaying the estimated cost associated with the target print job.

DETAILED DESCRIPTION

Figure 1:
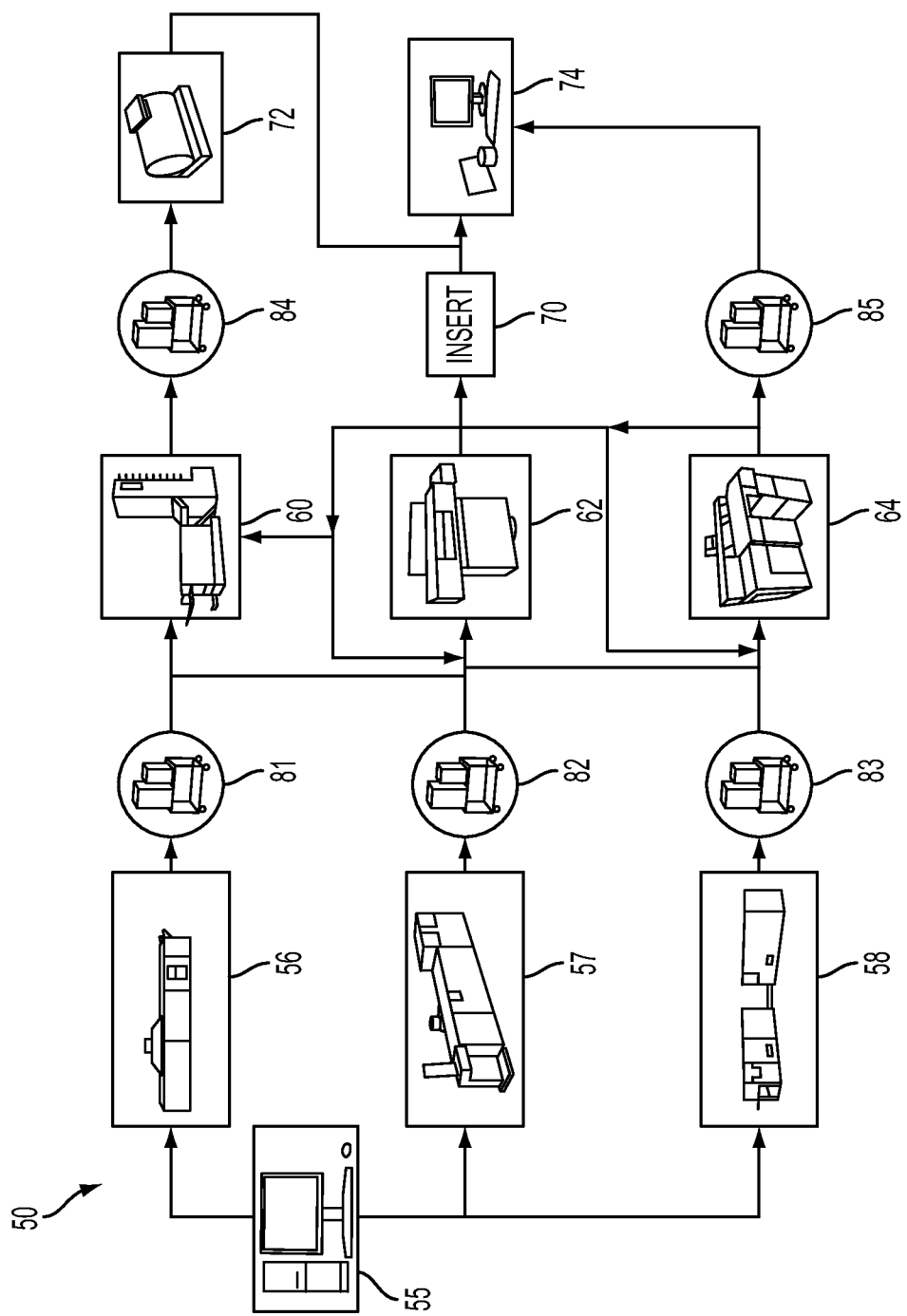
FIG. 1 illustrates an exemplary production environment according to an embodiment.

The following terms shall have, for purposes of this application, the respective meanings set forth below:

For purposes of the discussion below, a "print device" refers to a device capable of performing one or more functions, operations and/or services on a print job. For example, a print device may provide print-related services for one or more print jobs. A print device may include a printer, a cutter, a collator, a scanner, a fax machine, a multi-function device or other similar equipment.

A "job" refers to a logical unit of work that is to be completed for a customer. In a print environment, a job may include one or more print jobs from one or more clients. A print environment may include a plurality of jobs.

A "print job" refers to a job processed in a print production system. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "print shop" refers to an entity that includes a plurality of document production resources, such as printers, cutters, collators and the like. A print shop may be a freestanding entity, including one or more print-related devices, or it may be part of a corporation or other entity. Additionally, a print shop may communicate with one or more servers by way of a local area network or a wide area network, such as the Internet, the World Wide Web or the like.

A "historical print job" is a print job that has been previously processed by a print shop.

An "attribute" is a characteristic associated with a print job. Exemplary print job attributes may include a quantity, a number of pages, a press type, a number of colors, a number of colors on a side of a print job, a varnish, one or more dimensions, a fold type, a number of folds, a paper weight and/or the like.

A "nominal attribute" is an attribute associated with two or more categories of values that do not have an inherent ordering to them. For example, press type may be an exemplary nominal attribute. Press type may be associated with categories of values such as B1, B2, A4 and/or the like, that have no inherent ordering. Other exemplary nominal attributes may include fold type, bindery type, colors front, colors back and varnish.

A "numeric attribute" is an attribute associated with two or more categories of values that have numeric values and/or have an inherent ordering to them. Quantity, pages, width and height may be examples of numeric attributes.

A "cost driver" is an attribute of a print job that influences a cost of the print job by at least a certain amount, percentage and/or the like.

A "nominal cost driver" is a nominal attribute that is a cost driver. For example, press type, fold type, bindery type and varnish may be examples of a nominal cost driver.

A "numeric cost driver" is a numeric attribute that is a cost driver. Quantity, pages, width and height may be examples of numeric cost drivers.

"Processing" of a print job means performing one or more operations, such as printing, binding, collating and/or the like, on a print job to transform a print job in some manner and/or result in the display, transmission or conversion of the print job into a physical substrate.

FIG. 1 shows an example of a production environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85. Although the disclosed embodiments pertain to document production systems, the disclosed methods and systems can be applied to production systems in general.

Figure 2:
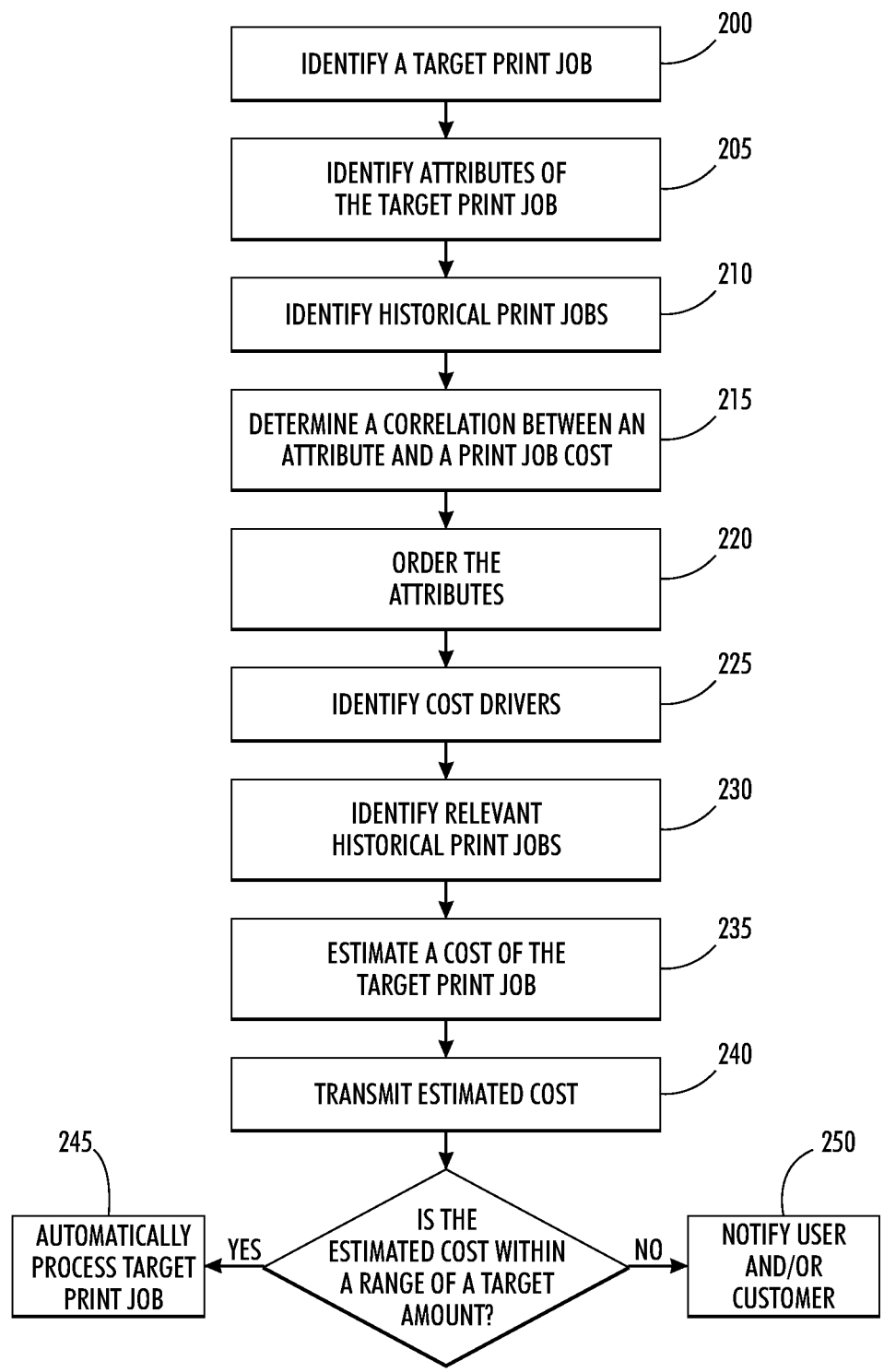
FIG. 2 illustrates an exemplary method of estimating the cost of a print job according to an embodiment.

FIG. 2 illustrates an exemplary method of estimating a cost of a print job according to an embodiment. As illustrated by FIG. 2, a target print job may be identified 200. In an embodiment, a target print job may be a print job whose cost is to be estimated. A target print job may be associated with a type. Exemplary types for print jobs may include books, magazines, envelopes, manuscripts and/or the like.

In an embodiment, one or more attributes associated with a target print job may be identified 205. In an embodiment, an attribute may be a characteristic associated with a print job. Exemplary print job attributes may include a quantity, a number of pages, a press type, a number of colors, a number of colors on a side of a print job, a varnish, one or more dimensions, a fold type, a number of folds, a paper weight and/or the like. In an embodiment, each print job of a certain type may include values for the same print job attributes. For example, a print job for a book may include values for the same print job attributes as another print job for a book. In an embodiment, one or more print job attributes may have a corresponding value. For example, a print job attribute of quantity may have a numerical value identifying the quantity of books to be processed. Table 1 illustrates exemplary print job attributes and corresponding print job attribute values for a print job having a book type.

In an embodiment, one or more historical print jobs having the same type as the target print job may be identified 210. A historical print job may be a print job that has been completely processed by a print production environment. For example, if the target print job is the book represented by Table 1, one or more historical print jobs having a book print type may be identified 210.

In an embodiment, a correlation between one or more attributes and a cost associated with a print job may be determined 215. In an embodiment, regression analysis may be used to determine 215 a correlation between an attribute and a print job cost. In an embodiment, regression analysis may be performed for one or more attributes, such that the attribute is the only predictor in the analysis. An R-square value associated with each attribute may be determined. In an embodiment, an R-square value may indicate the strength of the correlation between an attribute and a cost of the print job. For example, a higher R-square value may indicate a stronger correlation between the attribute and the print job cost. Conversely, a lower R-square value may indicate a weaker correlation between the attribute and the print job cost. Table 2 illustrates exemplary R-square values associated with each book attribute set forth in Table 1.

TABLE 2

| Attribute | R-Square |
| --- | --- |
| Quantity | 0.1932 |
| Paper Weight | 0.1274 |
| Pages | 0.1021 |
| Color Front | 0.073 |
| Color Back | 0.073 |
| Fold Type | 0.0674 |
| Press Type | 0.059 |
| Binder Type | 0.0293 |
| Number of Folds | 0.0253 |
| Flat Width | 0.013 |
| Varnish | 0.0004 |
| Flat Height | 0.0000 |

In an embodiment, one or more attributes of a print job may be ordered 220 according to R-square values. For example, as illustrated in Table 2, attributes may be ordered from the largest R-square value to the smallest R-square value.

In an embodiment, one or more cost drivers may be identified 225. In an embodiment, regression analysis may be performed using the attribute having the strongest R-square value, and a prediction error value associated with the analysis may be determined. In an embodiment, an attribute may be added to the predictor set, and regression analysis may be repeated to determine an updated prediction error value. In an embodiment, attributes may be added to the predictor set in a particular order. For example, attributes may be added to the predictor set one by one according to their R-square value. For example, an attribute having the highest R-square value may be added to the predictor set, followed by an attribute having the next highest R-square value, and so on.

In an embodiment, after an attribute is added to the predictor set, regression analysis may be performed to determine an

TABLE 1

| Quantity | Pages | Press Type | Colors Front | Colors Back | Varnish | Flat Width | Flat Height | Fold Type | # of Folds | Binder Type | Paper Weight |
| --- | --- | --- | --- | --- | --- | --- | --- | --- | --- | --- | --- |
| 3500 | 24 | B2 | 1 | 1 | None | 210 | 297 | Signature | 2 | Saddle | GSM 100 | updated prediction error value. Table 3 illustrates exemplary predictor sets and corresponding prediction error values for the attributes identified in Table 1.

TABLE 3

| Iteration | Predictor Set | Prediction Error Value | Decrease |
|---|---|---|---|
| 1 | Quantity | −63 | N/A |
| 2 | Quantity, Paper Weight | −54 | 9 |
| 3 | Quantity, Paper Weight, Pages | −41 | 13 |
| 4 | Quantity, Paper Weight, Pages, Colors Front | −41 | 0 |
| 5 | Quantity, Paper Weight, Pages, Colors Front, Colors Back | −41 | 0 |
| 6 | Quantity, Paper Weight, Pages, Colors Front, Colors Back, Fold Type | −41 | 0 |
| 7 | Quantity, Paper Weight, Pages, Colors Front, Colors Back, Fold Type, Press Type | −37 | 4 |
| 8 | Quantity, Paper Weight, Pages, Colors Front, Colors Back, Fold Type, Press Type, Binder Type | −37 | 0 |
| 9 | Quantity, Paper Weight, Pages, Colors Front, Colors Back, Fold Type, Press Type, Binder Type, Number of Folds | −37 | 0 |
| 10 | Quantity, Paper Weight, Pages, Colors Front, Colors Back, Fold Type, Press Type, Binder Type, Number of Folds, Flat Width | −36 | 1 |
| 11 | Quantity, Paper Weight, Pages, Colors Front, Colors Back, Fold Type, Press Type, Binder Type, Number of Folds, Flat Width, Varnish | −36 | 0 |
| 12 | Quantity, Paper Weight, Pages, Colors Front, Colors Back, Fold Type, Press Type, Binder Type, Number of Folds, Flat Width, Varnish, Flat Height | −35 | 1 |

In an embodiment, if the prediction error value decreases by a certain amount with the addition of an attribute to the predictor set, the added attribute may be identified 225 as a cost driver. For example, an attribute may be identified 225 as a cost driver if its addition to the predictor set reduces the prediction error value by at least a certain percent of the prediction error value. In an embodiment, an attribute may be identified 225 as a cost driver if its addition to the predictor set reduces the prediction error value by a certain number of points. In an embodiment, the attribute having the highest R-square value may be identified 225 as a cost driver.

For example, referring to Table 3, the attribute having the highest R-square value and attributes whose addition to the predictor set reduces the prediction error value by at least two points may be identified 225 as cost drivers. As such, the Quantity, Paper Weight, Pages and Press Type attributes may be identified as cost drivers.

In an embodiment, the cost drivers may be used to identify 230 one or more relevant historical print jobs. In an embodiment, to be considered a relevant historical print job, a historical print job may have the same nominal cost driver values as the target print job. A nominal cost driver is a cost driver that does not have a numerical value. For example, press type, fold type, binder type and varnish may be examples of a nominal cost driver.

In an embodiment, to be considered a relevant historical print job, a historical print job may have numeric cost driver values within one or more ranges of the numeric cost driver values of the target print job. In an embodiment, a numeric cost driver is a cost driver that has a numeric value. Quantity, pages, width and height may be examples of numeric cost drivers. For example, each numeric cost driver may have an associated range of values within which corresponding historical print job attribute values must fall to be considered a relevant historical print job. In an embodiment, the range may be the same or different for each cost driver value. For example, a quantity cost driver may have an associated range of +/−10 units. As such, historical print jobs having a quantity value that is plus or minus 10 of the quantity value of the target print job may be identified 230 as a relevant historical print job. Alternatively, a range may be +/−20%. As such, historical print jobs having a quantity that is plus or minus 20% of the quantity value of the target print job may be identified 230 as a relevant historical print job. In an embodiment, a range may be a number, a percentage and/or other value.

In an embodiment, a relevant historical print job may be a historical print job that has the same values as the target print job for each nominal cost driver value, and values within the associated range of the target print job for each numeric cost driver value. For example, Table 4 illustrates values of the cost drivers identified above for the exemplary target print job.

TABLE 4

| Quantity | Pages | Press Type | Paper Weight |
|---|---|---|---|
| 3500 | 24 | B2 | GSM100 |

Table 5 illustrates exemplary cost driver values of historical print jobs according to an embodiment.

TABLE 5

| Quantity | Pages | Press Type | Paper Weight |
|---|---|---|---|
| 3000 | 60 | B2 | GSM220 |
| 3200 | 24 | B2 | GSM100 |
| 2100 | 30 | B1 | GSM105 |
| 3000 | 24 | B2 | GSM100 |
| 4500 | 24 | A4 | GSM64 |
| 4000 | 24 | B2 | GSM100 |
| 3000 | 24 | B2 | GSM100 |
| 3600 | 50 | B1 | GSM220 |
| 3400 | 45 | B2 | GSM105 |
| 3000 | 24 | B2 | GSM100 |

In an embodiment, the numeric cost drivers (i.e., Quantity and Pages) may be associated with the following ranges: Quantity=2800-4200; Pages=24. In an embodiment, to be identified as a relevant historical print job, a historical print job must have the same nominal cost driver values as the target print job, and numeric cost driver values within the ranges associated with the cost drivers of the target print job. As such, Table 6 identifies the historical print jobs from Table 5 may be identified as relevant historical print jobs for the target print job identified in Table 4 (i.e., the historical print jobs that have a quantity value between 2800 and 4200, pages equal to 24, a B2 press type and a GSM100 paper weight).

TABLE 6

| Quantity | Pages | Press Type | Paper Weight |
|---|---|---|---|
| 3200 | 24 | B2 | GSM100 |
| 3000 | 24 | B2 | GSM100 |
| 4000 | 24 | B2 | GSM100 |
| 3000 | 24 | B2 | GSM100 |
| 3000 | 24 | B2 | GSM100 |

In an embodiment, historical print jobs having the same value for one or more nominal cost drivers as a target print job may not exist. For example, Table 7 illustrates exemplary cost driver values for a target print job, and Table 8 illustrates exemplary cost driver values for historical print jobs.

TABLE 7

| Quantity | Pages | Press Type | Paper Weight |
|---|---|---|---|
| 3000 | 15 | B2 | GSM100 |

TABLE 8

| Quantity | Pages | Press Type | Paper Weight |
|---|---|---|---|
| 2700 | 15 | B1 | GSM100 |
| 3000 | 20 | B1 | GSM100 |
| 3100 | 25 | B1 | GSM100 |
| 3400 | 10 | B1 | GSM100 |
| 2800 | 15 | B1 | GSM100 |
| 3600 | 15 | B1 | GSM100 |
| 3200 | 20 | B1 | GSM100 |
| 2500 | 10 | B1 | GSM100 |
| 2100 | 15 | B1 | GSM100 |

In an embodiment, the range associated with Quantity may be between 2800-3200 and the range associated with Pages may be +/−5. However, as illustrated in Table 8, there are no historical print jobs having a B2 Press Type. In an embodiment, if there are no historical print jobs having values defined by a target print job, then the cost driver may be ignored, and relevant historical print jobs may be identified based on the remaining cost drivers. For example, referring to Table 8, the Press Type cost driver may be ignored, and relevant historical print jobs may be identified using the values of the Quantity, Pages and Paper Weight cost drivers. Table 9 illustrates the historical print jobs that may be identified as relevant historical print jobs based on this analysis (i.e., Quantity=2800-3200, Pages=10-20, and Paper Weight=GSM100).

TABLE 9

| Quantity | Pages | Press Type | Paper Weight |
|---|---|---|---|
| 3000 | 20 | B1 | GSM100 |
| 3400 | 10 | B1 | GSM100 |
| 2800 | 15 | B1 | GSM100 |
| 3200 | 20 | B1 | GSM100 |

In an embodiment, there may not be historical print jobs having the nominal cost driver values and/or be within the range of the nominal cost driver values as defined by the target print job. For example, Table 10 identifies exemplary cost driver values for a target print job, and Table 11 identifies exemplary cost driver value for historical print jobs.

TABLE 10

| Quantity | Press Type |
|---|---|
| 2500 | B2 |

TABLE 11

| No. | Quantity | Press Type |
|---|---|---|
| 1 | 2300 | B2 |
| 2 | 2300 | B2 |
| 3 | 2800 | B2 |
| 4 | 2700 | B2 |
| 5 | 2200 | B2 |
| 6 | 3600 | B2 |

In an embodiment, the range associated with the Quantity cost driver may be +/−100 units. As such, relevant historical print jobs will be those that have a Quantity value between 2400-2600 units and a Press Type value of B2. As illustrated by Table 11, none of the historical print jobs meet these constraints. In an embodiment, if no historical print jobs meet the constraints of the target print job, then the range associated with one or more numeric cost drivers may be expanded. In an embodiment, the range may be expanded a certain amount, percentage and/or the like. For example, the range associated with the Quantity cost driver may be expanded on either end by 200 units. In an embodiment, the range may be expanded by a certain amount until a minimum number of historical print jobs meet the constraints of the target print job. For instance, to provide an accurate cost estimate, at least a certain number of historical print jobs may need to be examined.

For example, referring to Table 10 and Table 11, the range associated with the Quantity cost driver may be expanded on either end by 100, thus making the range between 2300-2700 units. By expanding the range, historical print job numbers 1, 2 and 4 are identified as relevant historical print jobs. If a minimum number of historical print jobs is five, then the range associated with Quantity may be expanded again. In an embodiment, the range may be expanded by the same amount as before, or by a different amount. For example, if the range associated with the Quantity cost driver is expanded again by 100 units, then the range would encompass historical print jobs having a Quantity between 2200-2800 units. By expanding the range, historical print job numbers 3 and 5 are identified as relevant historical print jobs, and five historical print jobs are identified.

In an embodiment, historical print jobs having the same values for two or more nominal cost drivers as a target print job may not exist. For example, Table 12 illustrates exemplary cost driver values for a target print job according to an embodiment. Table 13 illustrates exemplary cost driver values for historical print jobs according to an embodiment.

TABLE 12

| Press Type | Paper Weight |
|---|---|
| B2 | GSM100 |

TABLE 13

| No. | Press Type | Paper Weight |
|---|---|---|
| 1 | B2 | GSM105 |
| 2 | B1 | GSM100 |
| 3 | B2 | GSM220 |
| 4 | B1 | GSM105 |
| 5 | B2 | GSM105 |
| 6 | B1 | GSM100 |

As illustrated by Table 13, there are no historical print jobs having both a Press Type value of B2 and a Paper Weight value of GSM100. In an embodiment, each cost driver may be considered individually, and historical print jobs having a value equal to the cost driver, independent of other cost drivers, may be identified as a relevant historical print job.

For example, referring to Table 13, historical print jobs having a Press Type value of B2 or a Paper Weight value of GSM100 may be identified as relevant historical print jobs. As such, historical print job numbers 1, 2, 3, 5 and 6 may be identified as relevant historical print jobs. Although only two nominal cost drivers are discussed, it is understood that additional and/or alternate number of nominal cost drivers may be used within the scope of this disclosure.

In an embodiment, the relevant historical print jobs may be used to estimate 235 the cost of a target print job. In an embodiment, a statistical regression model may be used to estimate 235 the cost of a target print job. In an embodiment, only numeric cost drivers may be used to build a statistical regression model. This is because all relevant historical print jobs share the same nominal cost driver values as the target print job. In an embodiment, the cost of a target print job may be estimated 235 by the following: Log(cost)=a+(b*First Numeric Cost Driver Associated with Target Print Job)+(c*Second Numeric Cost Driver Associated with Target Print Job)+ . . . , where a and b are coefficients estimated 235 by building the statistical regression model using the identified relevant historical print jobs. For example, one or more coefficients may be estimated using a least square estimation method.

For example, the cost of the target print job illustrated in Table 4 may be estimated 235 by identifying the numeric cost drivers associated with the target print job. In this case, the only numeric cost driver is Quantity. As such, the cost of the target print job may be estimated 235 by:

$$\text{Log(cost)}=a+(b*\text{Quantity Associated with Target Print Job})$$

The coefficients may be estimated as:

a=5.16539
b=0.00046

As such, the cost of the target print job illustrated in Table 4 may be estimated 235 by:

$$\text{Log(cost)}=5.16539+0.00046*3500=\$876$$

In an embodiment, the estimated cost of a target print job may be transmitted 240 to a user, a customer and/or the like. For example, a cost associated with processing a book may be estimated for Customer A. The estimated cost may be emailed, faxed, displayed and/or the like to a user, a representative of Customer A and/or the like.

In an embodiment, a target print job may be processed 245 based on the estimated cost. For example, a customer may specify that if the estimated cost of a target print job is within a range of a certain target amount, that the target print job should automatically be processed 245. For instance, Customer A may specify that a book print job should automatically be processed 245 if the estimated cost of processing the book print job is no more than 10% of a target amount of $1,000.

In an embodiment, document types, customers, target prices and target price variances may be stored in a database or other computer-readable storage medium. When a target print job is received from a customer, the database may be accessed to determine whether a target cost associated with the customer and the document type is present. If so, an estimated cost of processing the target print job may be estimated, and the estimated cost may be compared to the target cost for the customer and document type. If the estimated cost satisfies the target price variance associated with the customer and document type, the target print job may be automatically processed 245. If the estimated cost does not satisfy the target price variance, a user and/or the customer may be notified 250, and the customer may be required to expressly authorize processing of the print job.

In an embodiment, an estimated cost for a target print job may be compared to an actual cost associated with the target print job. For example, a print job that has already been processed may have a corresponding cost of what it actually cost a customer to process the print job. In an embodiment, the print job may have been processed by a different print shop, a print shop managed by a different entity and/or the like. In an embodiment, a customer may be notified of the estimated cost associated with a print job, the actual cost associated with a print job, a deviation between the estimated cost and the actual cost and/or the like. For example, the estimated cost and/or actual cost may be displayed to a customer on a computing device. In an embodiment, an email may be sent to a customer that includes the estimated cost and/or the actual cost.

The following is an example of estimating a cost for processing a book print job type. It is understood that additional and/or alternate print job types may be used within the scope of this disclosure.

A cost associated with processing a target print job having a book print job type and the attributes and attribute values set forth in Table 14 may be estimated.

TABLE 14

| Quantity | Pages | Press Type | Colors Front | Colors Back | Varnish | Flat Width | Flat Height | Fold Type | # of Folds | Binder Type | Paper Weight |
|---|---|---|---|---|---|---|---|---|---|---|---|
| 2000 | 100 | B2 | 5 | 2 | None | 200 | 300 | Signature | 2 | Saddle | GSM 100 |

In an embodiment, a correlation between each of the above identified attributes and a cost of the print job may be determined 215 by using regression analysis to determine an R-square value associated with each attribute. Exemplary R-square values and corresponding attributes are listed below in Table 15.

TABLE 15

| Attribute | R-Square |
|---|---|
| Quantity | 0.2041 |
| Pages | 0.1658 |
| Color Front | 0.084 |
| Color Back | 0.072 |
| Paper Weight | 0.063 |
| Fold Type | 0.061 |
| Press Type | 0.056 |
| Binder Type | 0.029 |
| Number of Folds | 0.023 |
| Flat Width | 0.013 |
| Flat Height | 0.001 |
| Varnish | 0.000 |

In an embodiment, regression analysis may be performed on a predictor set comprising the attribute having the highest R-Square value, the Quantity attribute, to determine a prediction error value. The attribute having the next highest R-Square value, the Pages attribute, may be added to the predictor set, and regression analysis may be performed on the updated predictor set to determine an updated prediction error value. This process may be repeated for each attribute having the next highest R-Square value. Table 16 illustrates exemplary predictor sets and prediction error values.

TABLE 16

| Iteration | Predictor Set | Prediction Error Value | Decrease |
|---|---|---|---|
| 1 | Quantity | −70 | N/A |
| 2 | Quantity, Pages | −65 | 5 |
| 3 | Quantity, Pages, Colors Front | −58 | 7 |
| 4 | Quantity, Pages, Colors Front, Colors Back | −53 | 5 |
| 5 | Quantity, Pages, Colors Front, Colors Back, Paper Weight | −51 | 2 |
| 6 | Quantity, Pages, Colors Front, Colors Back, Paper Weight, Fold Type | −50 | 1 |
| 7 | Quantity, Pages, Colors Front, Colors Back, Paper Weight, Fold Type, Press Type | −48 | 2 |
| 8 | Quantity, Pages, Colors Front, Colors Back, Paper Weight, Fold Type, Press Type, Binder Type | −47 | 1 |
| 9 | Quantity, Pages, Colors Front, Colors Back, Paper Weight, Fold Type, Press Type, Binder Type, Number of Folds | −47 | 0 |
| 10 | Quantity, Pages, Colors Front, Colors Back, Paper Weight, Fold Type, Press Type, Binder Type, Number of Folds, Flat Width | −44 | 3 |
| 11 | Quantity, Pages, Colors Front, Colors Back, Paper Weight, Fold Type, Press Type, Binder Type, Number of Folds, Flat Height | −42 | 2 |
| 12 | Quantity, Pages, Colors Front, Colors Back, Paper Weight, Fold Type, Press Type, Binder Type, Number of Folds, Flat Height, Varnish | −42 | 0 |

In an embodiment, the attribute having the highest R-square value and attributes whose addition to the predictor set reduces the prediction error value by at least five points may be identified 225 as cost drivers. In this case, the cost drivers are Quantity, Pages, Colors Front and Colors Back.

In an embodiment, these cost drivers may be used to identify 230 relevant historical print jobs having a book print job type. Table 17 illustrates exemplary historical print jobs having a book print job type.

TABLE 17

| Quantity 2000 | Pages 100 | Colors Front 5 | Colors Back 2 | Price |
|---|---|---|---|---|
| 2050 | 90 | 2 | 1 | 689.45 |
| 3200 | 150 | 1 | 3 | 845.32 |
| 2100 | 80 | 4 | 4 | 709.56 |
| 1700 | 50 | 5 | 2 | 699.23 |
| 2000 | 105 | 4 | 1 | 773.87 |
| 1900 | 100 | 5 | 3 | 800.76 |
| 1850 | 125 | 5 | 3 | 775.90 |
| 2450 | 90 | 1 | 3 | 689.00 |
| 3500 | 75 | 4 | 2 | 709.34 |
| 1000 | 110 | 6 | 2 | 607.12 |
| 2000 | 80 | 4 | 2 | 615.23 |

In an embodiment, the cost drivers may have the ranges set forth in Table 18. In an embodiment, a relevant historical print job must have attribute values within the range associated with the corresponding cost driver value for each of the cost drivers.

TABLE 18

| Cost Driver | Range |
|---|---|
| Quantity | +/−100 |
| Pages | +/−10 |
| Colors Front | +/−1 |

TABLE 18-continued

| Cost Driver | Range |
|---|---|
| Colors Back | +/−1 |

As such, the historical print jobs identified in Table 19 may be those identified as relevant to the target print job.

TABLE 19

| Quantity 2000 | Pages 100 | Colors Front 5 | Colors Back 2 | Price |
|---|---|---|---|---|
| 2050 | 90 | 2 | 1 | 689.45 |
| 2000 | 105 | 4 | 1 | 773.87 |
| 1900 | 100 | 5 | 3 | 800.76 |

In an embodiment, these relevant historical print jobs may be used to estimate 230 the cost of the target print job. In an embodiment, Colors Front and Colors Back may be considered nominal cost drivers, and therefore not considered in estimating 235 the cost of the target print job. For example, a numeric value associated with Colors Front and/or Colors Back may represent a category associated with a range of color numbers. For instance '1' may correspond to one, two or three colors, '2' may correspond to four, five or six colors, and so on. In an embodiment, the cost of the target print job may be estimated by:

Log(cost)=$a$+($b$*Quantity)+($c$*Pages), where the coefficients $a$, $b$ and $c$ are estimated as:

$a$=6.6455342,
$b$=−0.0003416, and
$c$=0.0065621,
As such, the estimated cost may be represented by:

exp($a$+($b$*Quantity)+($c$*Pages))=exp(6.6455342+(−0.0003416*2000)+(0.0065621*100))=$748.85.

In an embodiment, the customer of the target print job may have specified that the target print job was to be automatically processed if the cost was between $700.00 and $800.00. Since the estimated cost is within this range, the target print job may be automatically processed 245.

Figure 3:
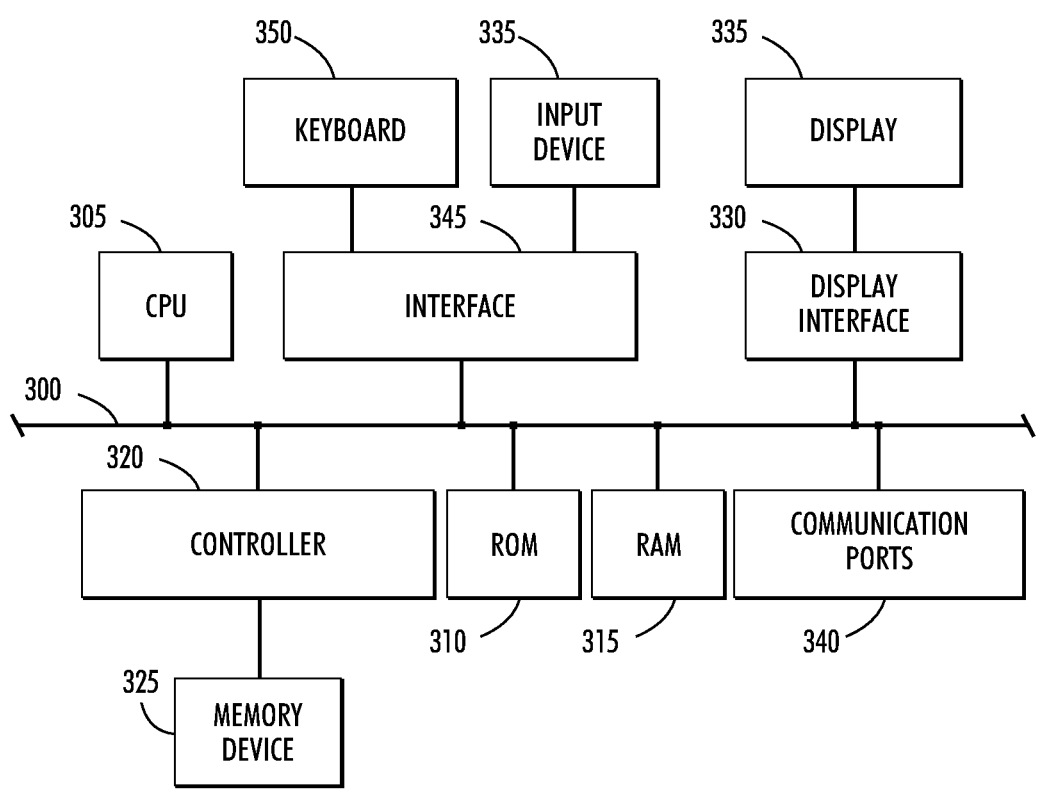
FIG. 3 illustrates exemplary internal hardware that may be used to contain or implement program instructions according to an embodiment.

FIG. 3 depicts a block diagram of exemplary internal hardware that may be used to contain or implement program instructions according to an embodiment. A bus 300 serves as the main information highway interconnecting the other illustrated components of the hardware. CPU 305 is the central processing unit of the system, performing calculations and logic operations required to execute a program. Read only memory (ROM) 310 and random access memory (RAM) 315 constitute exemplary memory devices.

A controller 320 interfaces with one or more optional memory devices 325 to the system bus 300. These memory devices 325 may include, for example, an external or internal DVD drive, a CD ROM drive, a hard drive, flash memory, a USB drive or the like. As indicated previously, these various drives and controllers are optional devices.

Program instructions may be stored in the ROM 310 and/or the RAM 315. Optionally, program instructions may be stored on a tangible computer readable storage medium such as a hard disk, compact disk, a digital disk, flash memory, a memory card, a USB drive, an optical disc storage medium, such as Blu-ray™ disc, and/or other recording medium.

An optional display interface 330 may permit information from the bus 300 to be displayed on the display 335 in audio, visual, graphic or alphanumeric format. Communication with external devices may occur using various communication ports 340. An exemplary communication port 340 may be attached to a communications network, such as the Internet or an intranet.

The hardware may also include an interface 345 which allows for receipt of data from input devices such as a keyboard 350 or other input device 355 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of estimating the cost of a target print job, the method comprising:
    identifying a target print job having a document type and one or more attributes;
    for each attribute of the target print job, determining a correlation between the attribute and a cost of the target print job using a plurality of historical print jobs associated with the document type, wherein determining the correlation comprises, for each attribute associated with each historical print job, performing regression analysis on the attribute to determine an R-square value associated with the attribute;
    identifying, by a computing device, one or more of the attributes as cost drivers based on the correlation of the attribute to the cost of the target print job by:
        assigning the attribute associated with a highest R-square value to a predictor set,
        performing regression analysis on the predictor set to determine a prediction error value,
        adding the attribute associated with a next highest R-square value to the predictor set,
        determining an updated prediction error value by performing regression analysis on the predictor set, and
        in response to a difference between the prediction error value and the updated prediction error value exceeding a threshold value, identifying the added attribute as a cost driver;
    identifying one or more relevant historical print jobs from the plurality of historical print jobs based on values for the identified cost drivers;
    estimating, by the computing device, a cost of the target print job using the one or more relevant historical print jobs; and
    displaying, on a display device, the estimated cost associated with the target print job.

2. The method of claim 1, further comprising repeating the performing, adding, determining and identifying for each attribute.

3. The method of claim 1, wherein identifying one or more relevant historical print jobs comprises identifying one or more historical print jobs having:
    values equal to those of the target print job for each cost driver that is a nominal attribute; and
    values that are within one or more ranges of values of the target print job for each cost driver that is a numeric attribute.

4. The method of claim 3, further comprising:
    in response to no historical print jobs comprising values equal to those of the target print job for each cost driver that is a nominal attribute and values that are within one or more ranges of values of the target print job for each cost driver that is a numeric attribute, expanding a range associated with a numeric attribute until a minimum number of relevant historical print jobs are identified.

5. The method of claim 1, wherein estimating a cost of the target print job comprises performing regression analysis based on:
    values of attributes of the target print job that correspond to cost drivers that are numeric attributes, and
    a plurality of coefficients.

6. The method of claim 1, further comprising:
    in response to the estimated cost of the target print job being within a range of a target cost, automatically processing the target print job.

7. The method of claim 1, further comprising:
    in response to the estimated cost of the target print job being outside of a range of a target cost, notifying a user of the estimated cost and the target cost; and
    in response to receiving authorization from the user, processing the target print job.

8. A system for estimating the cost of a target print job, the system comprising:
    a computing device; and
    a computer-readable storage medium in communication with the computing device, wherein the computer-readable storage medium comprises one or more programming instructions for:
        identifying a target print job having a document type and one or more attributes,
        for each attribute of the target print job, determining a correlation between the attribute and a cost of the target print job using a plurality of historical print jobs associated with the document type, wherein determining a correlation comprises, for each attribute associated with each historical print job, performing regression analysis on the attribute to determine an R-square value associated with the attribute,
        identifying one or more of the attributes as cost drivers based on the correlation of the attribute to the cost of the target print job by:
            assigning the attribute associated with a highest R-square value to a predictor set,
            performing regression analysis on the predictor set to determine a prediction error value,
            adding the attribute associated with a next highest R-square value to the predictor set,
            determining an updated prediction error value by performing regression analysis on the predictor set, and
            in response to a difference between the prediction error value and the updated prediction error value exceeding a threshold value, identifying the added attribute as a cost driver,
        identifying one or more relevant historical print jobs from the plurality of historical print jobs based on values for the identified cost drivers,
        estimating a cost of the target print job using the one or more relevant historical print jobs, and
        displaying the estimated cost associated with the target print job.

9. The system of claim 8, wherein the computer-readable storage medium further comprises one or more programming instructions for repeating the performing, adding, determining and identifying for each attribute.

10. The system of claim 8, wherein the one or more programming instructions for identifying one or more relevant historical print jobs comprise one or more programming instructions for identifying one or more historical print jobs having:
   values equal to those of the target print job for each cost driver that is a nominal attribute; and
   values that are within one or more ranges of values of the target print job for each cost driver that is a numeric attribute.

11. The system of claim 10, wherein the computer-readable storage medium further comprises one or more programming instructions for:
   in response to no historical print jobs comprising values equal to those of the target print job for each cost driver that is a nominal attribute and values that are within one or more ranges of values of the target print job for each cost driver that is a numeric attribute, expanding a range associated with a numeric attribute until a minimum number of relevant historical print jobs are identified.

12. The system of claim 8, wherein the one or more programming instructions for estimating a cost of the target print job comprise one or more programming instructions for performing regression analysis based on:
   values of attributes of the target print job that correspond to cost drivers that are numeric attributes; and
   a plurality of coefficients.

13. The system of claim 8, wherein the computer-readable storage medium further comprises one or more programming instructions for:
   in response to the estimated cost of the target print job being within a range of a target cost, automatically processing the target print job.

14. The system of claim 8, wherein computer-readable storage medium further comprises one or more programming instructions for:
   in response to the estimated cost of the target print job being outside of a range of a target cost, notifying a user of the estimated cost and the target cost; and
   in response to receiving authorization from the user, processing the target print job.

* * * * *